United States Patent
Hassan et al.

(10) Patent No.: US 11,321,432 B2
(45) Date of Patent: *May 3, 2022

(54) COMPUTING DEVICE WITH ENVIRONMENT AWARE FEATURES

(71) Applicant: BlackBerry Limited, Waterloo (CA)

(72) Inventors: Ahmed E. Hassan, Kingston (CA); Denny Chiu, Milton (CA); John Ferguson Wilson, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,351

(22) Filed: Mar. 16, 2020

(65) Prior Publication Data

US 2020/0221303 A1 Jul. 9, 2020

Related U.S. Application Data

(60) Continuation of application No. 16/402,866, filed on May 3, 2019, now Pat. No. 10,631,167, which is a
(Continued)

(51) Int. Cl.
*G06F 21/31* (2013.01)
*G06F 21/62* (2013.01)
(Continued)

(52) U.S. Cl.
CPC .............. *G06F 21/31* (2013.01); *G06F 21/62* (2013.01); *H04M 1/66* (2013.01); *H04M 1/72457* (2021.01); *H04M 1/72463* (2021.01); *H04W 4/021* (2013.01); *H04W 4/029* (2018.02); *H04W 12/08* (2013.01); *H04W 12/084* (2021.01); *G06F 2221/2105* (2013.01);
(Continued)

(58) Field of Classification Search
CPC ......... H04M 1/72519; H04M 1/72577; H04M 1/66; H04M 1/72572; H04W 12/08; H04W 4/02; H04W 4/021; H04W 4/029; H04W 88/02; H04W 12/00503; G06F 21/31; G06F 21/62; G06F 2221/2105; G06F 2221/2111; G06F 2221/2137
See application file for complete search history.

(56) References Cited

U.S. PATENT DOCUMENTS

| 4,724,537 A | 2/1988 | Monet |
| 5,222,127 A * | 6/1993 | Fukui .................. H04M 1/56 379/131 |

(Continued)

FOREIGN PATENT DOCUMENTS

| EP | 1156406 | 11/2001 | |
| WO | WO-03081932 A1 * | 10/2003 | ............ H04W 12/08 |

OTHER PUBLICATIONS

LAM, First Office Action for CA2,820,107, dated Oct. 6, 2014.
(Continued)

*Primary Examiner* — Matthew C Sams
(74) *Attorney, Agent, or Firm* — Moffat & Co

(57) ABSTRACT

An electronic device is provided which automatically adjusts settings based on the environment of the electronic device. The settings of the electronic device which are adjusted may be security settings, filter settings, or status for instant messaging in dependence on the determined location of the electronic device.

24 Claims, 3 Drawing Sheets

Related U.S. Application Data continuation of application No. 16/017,074, filed on Jun. 25, 2018, now Pat. No. 10,327,146, which is a continuation of application No. 15/137,685, filed on Apr. 25, 2016, now Pat. No. 10,009,771, which is a continuation of application No. 14/853,486, filed on Sep. 14, 2015, now Pat. No. 9,326,149, which is a continuation of application No. 14/260,375, filed on Apr. 24, 2014, now Pat. No. 9,137,668, which is a continuation of application No. 12/987,583, filed on Jan. 10, 2011, now abandoned, which is a division of application No. 12/538,851, filed on Aug. 10, 2009, now Pat. No. 7,869,789, which is a continuation of application No. 11/687,354, filed on Mar. 16, 2007, now Pat. No. 7,574,200, which is a continuation of application No. 10/786,030, filed on Feb. 26, 2004, now Pat. No. 7,400,878.

(51) Int. Cl.

| | | |
|---|---|---|
| *H04M 1/66* | (2006.01) | |
| *H04W 4/029* | (2018.01) | |
| *H04W 12/08* | (2021.01) | |
| *H04M 1/72457* | (2021.01) | |
| *H04M 1/72463* | (2021.01) | |
| *H04W 12/084* | (2021.01) | |
| *H04W 4/021* | (2018.01) | |
| *H04W 88/02* | (2009.01) | |
| *H04M 1/724* | (2021.01) | |
| *H04W 4/02* | (2018.01) | |

(52) U.S. Cl.
CPC ............... *G06F 2221/2111* (2013.01); *G06F 2221/2137* (2013.01); *H04M 1/724* (2021.01); *H04W 4/02* (2013.01); *H04W 88/02* (2013.01)

(56) References Cited

U.S. PATENT DOCUMENTS

| | | | | |
|---|---|---|---|---|
| 5,634,196 A * | 5/1997 | Alford | ............... | H04M 1/2745 455/18 |
| 5,646,604 A | 7/1997 | Maruyama et al. | | |
| 6,154,665 A * | 11/2000 | Briffett | ............... | H04B 1/3833 455/574 |
| 6,161,005 A | 12/2000 | Pinzon | | |
| 6,314,283 B1 | 11/2001 | Fielden | | |
| 6,429,856 B1 * | 8/2002 | Omura | ............... | G06F 3/0416 178/18.09 |
| 6,523,126 B1 | 2/2003 | Brabenac | | |
| 6,799,209 B1 | 9/2004 | Hayton | | |
| 6,842,105 B1 | 1/2005 | Henderson et al. | | |
| 7,099,684 B2 | 8/2006 | Cowsky, III et al. | | |
| 7,400,878 B2 * | 7/2008 | Hassan | ............... | H04W 4/021 455/410 |
| 7,498,951 B2 * | 3/2009 | Wardimon | ............... | G01J 1/32 340/691.3 |
| 7,574,200 B2 * | 8/2009 | Hassan | ............... | H04M 1/66 455/410 |
| 7,603,421 B1 | 10/2009 | Roche et al. | | |
| 7,869,789 B2 * | 1/2011 | Hassan | ............... | H04M 1/72572 455/410 |
| 8,090,364 B2 | 1/2012 | Delalat | | |
| 8,727,882 B2 | 5/2014 | Lum et al. | | |
| 8,972,762 B2 | 3/2015 | DeLuca | | |
| 9,031,532 B2 * | 5/2015 | Dam Nielsen | ............... | H04M 1/67 455/410 |
| 9,137,668 B2 * | 9/2015 | Hassan | ............... | H04W 12/08 |
| 9,326,149 B2 * | 4/2016 | Hassan | ............... | H04W 4/029 |
| 10,009,771 B2 * | 6/2018 | Hassan | ............... | G06F 21/31 |
| 10,327,146 B2 * | 6/2019 | Hassan | ............... | G06F 21/31 |
| 2001/0036273 A1 * | 11/2001 | Yoshizawa | ............... | H04L 63/083 380/247 |
| 2001/0047363 A1 * | 11/2001 | Peng | ............... | H04L 67/18 |
| 2002/0196274 A1 * | 12/2002 | Comfort | ............... | G06F 21/31 715/741 |
| 2003/0074590 A1 | 4/2003 | Fogle et al. | | |
| 2003/0218383 A1 | 11/2003 | Milojicic et al. | | |
| 2004/0027334 A1 | 2/2004 | Wu et al. | | |
| 2004/0034853 A1 * | 2/2004 | Gibbons | ............... | G06F 16/958 717/174 |
| 2004/0082322 A1 | 4/2004 | Tani | | |
| 2004/0123161 A1 * | 6/2004 | Harada | ............... | G06F 1/1616 726/35 |
| 2004/0203895 A1 * | 10/2004 | Balasuriya | ............... | H04M 1/72516 455/456.1 |
| 2005/0046580 A1 * | 3/2005 | Miranda-Knapp | ............... | G08B 13/1418 340/686.1 |
| 2005/0077997 A1 | 4/2005 | Landram et al. | | |
| 2005/0164675 A1 * | 7/2005 | Tuulos | ............... | H04L 63/105 455/410 |
| 2005/0193144 A1 * | 9/2005 | Hassan | ............... | H04M 1/66 709/238 |
| 2005/0250456 A1 | 11/2005 | Motohashi | | |
| 2007/0155405 A1 * | 7/2007 | Hassan | ............... | H04M 1/72572 455/456.1 |
| 2007/0274233 A1 | 11/2007 | Ptashek et al. | | |
| 2008/0123527 A1 | 5/2008 | Shahidi et al. | | |
| 2008/0207167 A1 | 8/2008 | Bugenhagen | | |
| 2010/0005523 A1 * | 1/2010 | Hassan | ............... | H04W 4/021 726/19 |
| 2010/0049881 A1 | 2/2010 | Manor et al. | | |
| 2011/0105073 A1 * | 5/2011 | Hassan | ............... | H04W 4/021 455/334 |
| 2011/0150202 A1 | 6/2011 | Cheng | | |
| 2012/0163226 A1 | 6/2012 | Tomizawa et al. | | |
| 2014/0237548 A1 * | 8/2014 | Hassan | ............... | G06F 21/31 726/3 |
| 2016/0007203 A1 * | 1/2016 | Hassan | ............... | H04W 12/0804 455/456.4 |
| 2017/0026841 A1 * | 1/2017 | Hassan | ............... | H04W 4/029 |
| 2018/0310180 A1 * | 10/2018 | Hassan | ............... | H04W 4/029 |

OTHER PUBLICATIONS

LAM, Fourth Office Action for CA2,820,107, dated Jul. 28, 2017.
LAM, Second Office Action for CA2,820,107, dated Sep. 23, 2015.
LAM, Third Office Action for CA2,820,107, dated Aug. 19, 2016.
LAM, Fifth Office Action for CA2,820,107, dated Jul. 25, 2018.

\* cited by examiner

COMPUTING DEVICE WITH ENVIRONMENT AWARE FEATURES

CROSS-REFERENCE TO RELATED APPLICATIONS

This application is a continuation of U.S. patent application Ser. No. 16/402,866 filed May 3, 2019, which is a continuation of U.S. patent application Ser. No. 16/017,074 filed Jun. 25, 2018 (issued Jun. 18, 2019 as U.S. Pat. No. 10,327,146), which is a continuation of U.S. patent application Ser. No. 15/137,685 filed Apr. 25, 2016 (issued Jun. 26, 2018 as U.S. Pat. No. 10,009,771), which is a continuation of U.S. patent application Ser. No. 14/853,486 filed Sep. 14, 2015 (issued Apr. 26, 2016 as U.S. Pat. No. 9,326,149), which is a continuation of U.S. patent application Ser. No. 14/260,375 filed Apr. 24, 2014 (issued Sep. 15, 2015 as U.S. Pat. No. 9,137,668), which is a continuation of U.S. patent application Ser. No. 12/987,583 filed Jan. 10, 2011, which is a divisional of U.S. patent application Ser. No. 12/538,851 filed Aug. 10, 2009 (issued Jan. 11, 2011 as U.S. Pat. No. 7,869,789), which is a continuation of U.S. application Ser. No. 11/687,354 filed Mar. 16, 2007 (issued Aug. 11, 2009 as U.S. Pat. No. 7,574,200), which is a continuation of U.S. application Ser. No. 10/786,030 filed Feb. 26, 2004 (issued Jul. 15, 2008 as U.S. Pat. No. 7,400,878). The entire contents of these applications are hereby incorporated by reference.

TECHNICAL FIELD

This application relates to computing devices used in changing environments.

BACKGROUND

The versatility of and uses for mobile electronic devices, and in particular such devices that are processor based and enabled for wireless communications, continue to expand. In many cases, utility features or mechanisms that are applied to mobile communications devices are often just substantial copies of those applied to conventional desktop computers. In such cases, the utility features do not take into consideration or take advantage of the aspects of mobile communications devices that are unique over stationary desktop devices. For example, password locking mechanisms on mobile communications devices such as handheld devices are substantially just a copy of the password locking mechanism used by a desktop, wherein the handheld device will lock up if it has not received an input from the user for a configurable amount of time. For example, if the mobile device keyboard has not been used for 30 minutes, it will lock up and the user will have to enter a password or special key combination to unlock it. Such a locking mechanism fails to exploit the differences between a mobile device and a stationary desktop computer.

Thus, there is a need for utility features for mobile communications devices that take advantage of the unique aspects of mobile devices to provide increased convenience for the user of the device and/or increased security. For example, a device locking mechanism designed for use in the mobile environment is desired, as are other mechanisms.

BRIEF DESCRIPTION OF THE DRAWINGS

Like reference numerals are used throughout the Figures to denote similar elements and features.

DETAILED DESCRIPTION

Figure 1:
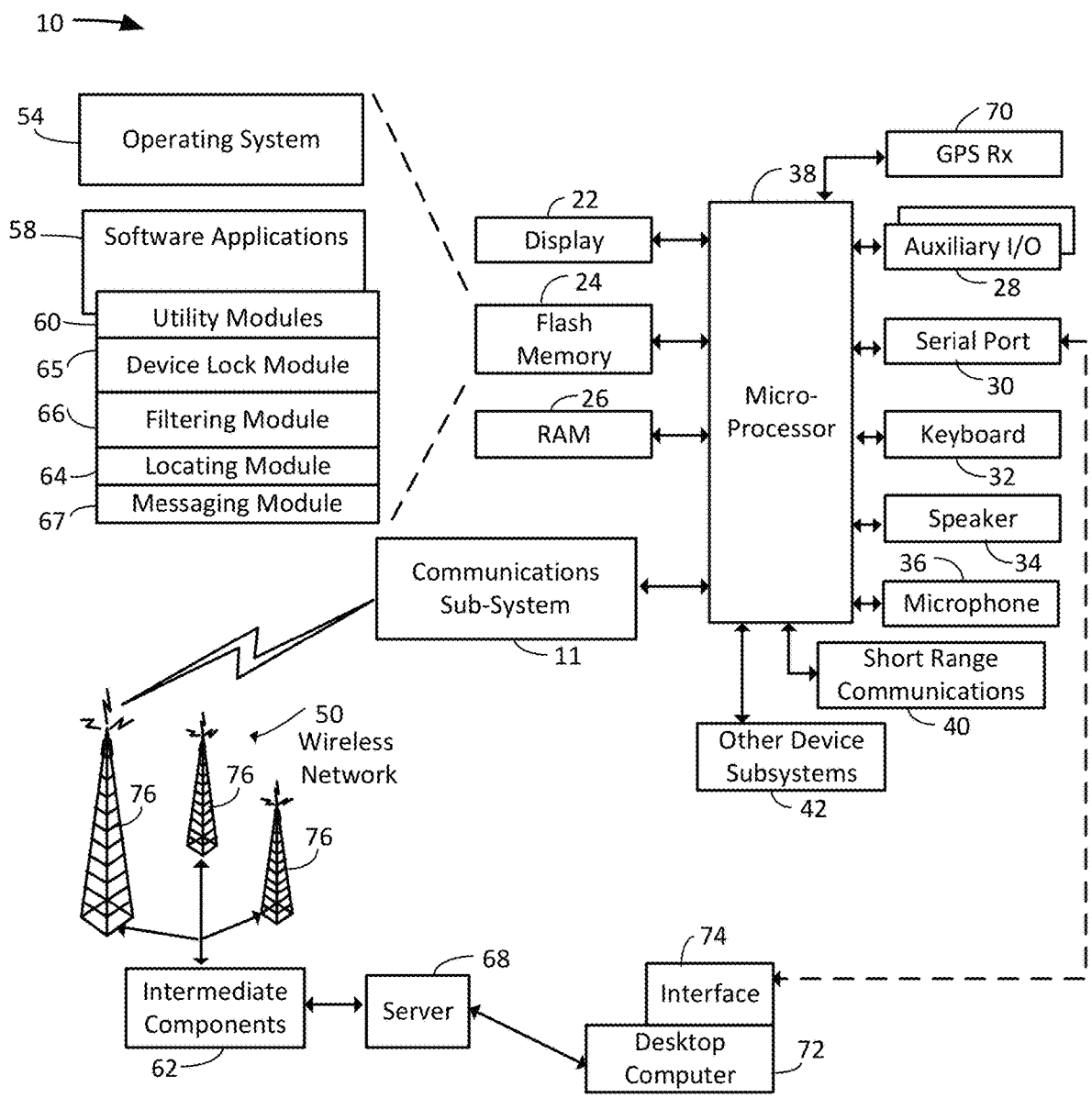
FIG. 1 is a block diagram showing a communications system including a mobile communications device to which the present application may be applied.

According to various example embodiments of the present application, utility features of a computing device, such as a password based locking mechanism or a mail filtering mechanism, are configured to automatically adjust based on the environment of the computing device.

According to one example embodiment, there is provided a method for providing security to a mobile electronic device, the method comprising: receiving an input signal from a first input device of the mobile electronic device; determining a location of the mobile electronic device based on the input signal received from the first input device; determining a security setting associated with the determined location, wherein the security setting is a home security setting when the mobile electronic device is within a predetermined proximity of a user's home as determined by a predetermined home location, a work security setting when the mobile electronic device is within a predetermined proximity of a user's work as determined by a predetermined work location, and an other location security setting when the mobile electronic device is not within a predetermined proximity of the home location or the work location; and automatically applying the determined security setting on the mobile electronic device.

According to another example embodiment, there is provided a mobile electronic device, comprising: a mobile electronic device, comprising: a processor; a first input device connected to the processor for receiving inputs; the processor being configured for determining location information for the mobile electronic device based on input signals received from the first input device; and a device lock module associated with the processor for: receiving an input signal from a first input device of the mobile electronic device; determining a location of the mobile electronic device based on the input signal received from the first input device; determining a security setting associated with the determined location, wherein the security setting is a home security setting when the mobile electronic device is within a predetermined proximity of a user's home as determined by a predetermined home location, a work security setting when the mobile electronic device is within a predetermined proximity of a user's work as determined by a predetermined work location, and an other location security setting when the mobile electronic device is not within a predetermined proximity of the home location or work location; and automatically applying the determined security setting on the mobile electronic device.

According to a further example embodiment, there is provided a method for providing security to a mobile electronic device, the method comprising: monitoring to determine when the mobile electronic device is locally connected to a computer; setting a lock state of the mobile electronic device to match a lock state of the computer when the mobile electronic device is locally connected to the computer; monitoring to detect a change in the lock state of the computer from unlocked to locked; and initiating a preset time delay when a change in the lock state of the computer from unlocked to locked is detected, determining whether the mobile electronic device is locally connected to the computer after an expiry of the preset time delay, and locking the mobile electronic device if the mobile electronic device remains locally connected to the computer after the expiry of the preset time delay.

According to a further example embodiment, there is provided a mobile electronic device, comprising: a processor; a user input device connected to the processor; an interface for docking the mobile electronic device to a computer; and a device lock module associated with the processor for implementing a locked state which places restrictions on access to the mobile electronic device, the device lock module being configured for requiring a predetermined user input through the user input device to remove the restrictions on user access when implemented; wherein the processor is configured for determining whether the mobile electronic device is docked to the computer; wherein the device lock module is configured for monitoring to determine when the mobile electronic device is locally connected to a computer; setting a lock state of the mobile electronic device to match a lock state of the computer when the mobile electronic device is locally connected to the computer; monitoring to detect a change in the lock state of the computer from unlocked to locked; and initiating a preset time delay when a change in the lock state of the computer from unlocked to locked is detected, determining whether the mobile electronic device is locally connected to the computer after an expiry of the preset time delay, and locking the mobile electronic device if the mobile electronic device remains locally connected to the computer after the expiry of the preset time delay.

According to a further example embodiment, there is provided a method for providing security to a mobile electronic device, the method comprising: receiving an input signal from a first input device of the mobile electronic device; determining a location of the mobile electronic device based on input signals received from the first input device; automatically adapting a filter setting for filtering the electronic messages in dependence on the determined location; and filtering received electronic messages in dependence on the adapted filter setting.

According to a further example embodiment, there is provided a mobile electronic device, comprising: a processor; a communication subsystem connected to the processor for exchanging signals with a wireless communication network and for receiving electronic messages; a first input device connected to the processor for receiving an input signal; the processor being configured for determining location information for the mobile electronic device based on the input signal received from the first input device; and a message filtering module associated with the processor for filtering electronic messages received by the mobile electronic device, the message filtering module being configured for automatically adapting a filter setting for filtering the electronic messages in dependence on the determined location information and being further configured for filtering received electronic messages in dependence on the adapted filter setting.

According to a further example embodiment, there is provided a method for providing security to a mobile electronic device, the method comprising: receiving an input signal from a first input device of the mobile electronic device; determining a location of the mobile electronic device based on the input signal received from the first input device; automatically setting a status used by an instant messaging module in dependence on the determined location; and providing a changed status used by the instant messaging module to another instant messaging user.

According to a further example embodiment, there is provided a mobile electronic device enabled for receiving electronic messages, comprising: a processor; a first input device connected to the processor for receiving inputs; a communication subsystem connected to the processor for exchanging signals with a wireless communication network and for receiving electronic messages; the processor being configured for determining a location of the mobile electronic device based on input signals received from the first input device; and an instant messaging module associated with the processor for sending and receiving instant messages on the mobile electronic device, the instant messaging module being configured for automatically setting a status used by the instant messaging module in dependence on the determined location information.

According to a further example embodiment, there is provided a computer software product having a computer-readable medium having stored thereon software code executable by a processor of a mobile device electronic for instructing the processor to perform the methods for providing security to a mobile electronic device described herein.

Referring now to the drawings, FIG. 1 is a block diagram of a mobile communication device 10 to which the present application is applied in an example embodiment. In an example embodiment, the mobile communication device 10 is a two-way communication device having at least data and, in some cases, also voice communication capabilities. In the example embodiment, the device 10 has the capability to communicate with other computer systems on the Internet. Depending on the functionality provided by the device, in various embodiments the device may be a data communication device, a multiple-mode communication device configured for both data and voice communication, a mobile telephone, a PDA (personal digital assistant) enabled for wireless communication, a PDA not enabled for wireless communication, or a computer system with or without a wireless modem, among other things.

The device 10 includes a communication subsystem 11 for exchanging signals with a wireless communication network 50. As will be apparent to those skilled in the field of communications, the particular design of the communication subsystem 11 will be dependent upon the communication network in which the device 10 is intended to operate.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28 (such as a thumbwheel or a vibration actuator, for example), serial port 30, keyboard or keypad 32, speaker 34, microphone 36, short-range communications subsystem 40, global Positioning System receiver (GPS Rx) 70 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on the device 10 during manufacture. Further applications may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

In some embodiments, for example in a personal digital assistant (PDA)-type communication device, the serial port 30 in FIG. 1 may be used to permit synchronization with a user's desktop computer 72. Such a port 30 would enable a user to set preferences through an external device or software application and would extend the capabilities of the device by providing for information or software downloads to the device 10 or uploads from the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

In some example embodiments, the device 10 includes a GPS receiver 70 for receiving location information from GPS satellites, thus enabling the device 10 to track its current location with a great deal of accuracy.

Wireless mobile network 50 is, in an example embodiment, a wireless packet data network, (e.g. Mobitex™ or DataTAC™), which provides radio coverage to mobile devices 10. Among other things, wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

In one example embodiment, the wireless network 50 is connected through one or more intermediate components 62 to one or more servers 68, which may be mail servers and/or access points for an intranet, the Internet, and/or other networks. Intermediate components 62 may include one or more gateways and/or connector systems as required to facilitate communications through the wireless network 50 with a plurality of mobile devices 10. The configuration of intermediate components 62 will depend on the desired functionality of the communications system and the type of wireless network 50, among other things.

In an example embodiment, among the software applications resident on the device 10 are one or more utility applications or modules 60. In various embodiments, utility applications may be stand alone applications, or may be sub-applications included as part of one or more larger software applications, or may be sub-applications integrated into operating system 54.

In an example embodiment, one of the utility applications is a device lock application or module 65 for locking the input and output interfaces of the mobile device 10 upon the occurrence of one or more predetermined conditions. Once the device has been locked, the user must enter use a password to unlock it. As known in the art, device lock mechanisms are used to prevent unauthorized access, and typically can either be manually triggered by the user (for example, by using the "Lock Computer" function in Microsoft™ Windows™) or automatically triggered by a period of mouse/keyboard inactivity for a user configured time period. Unlike conventional device lock mechanisms, according to example embodiments, the device lock module 85 of the present application automatically adapts its device lock behaviour based on the environment of the device 10.

Figure 2:
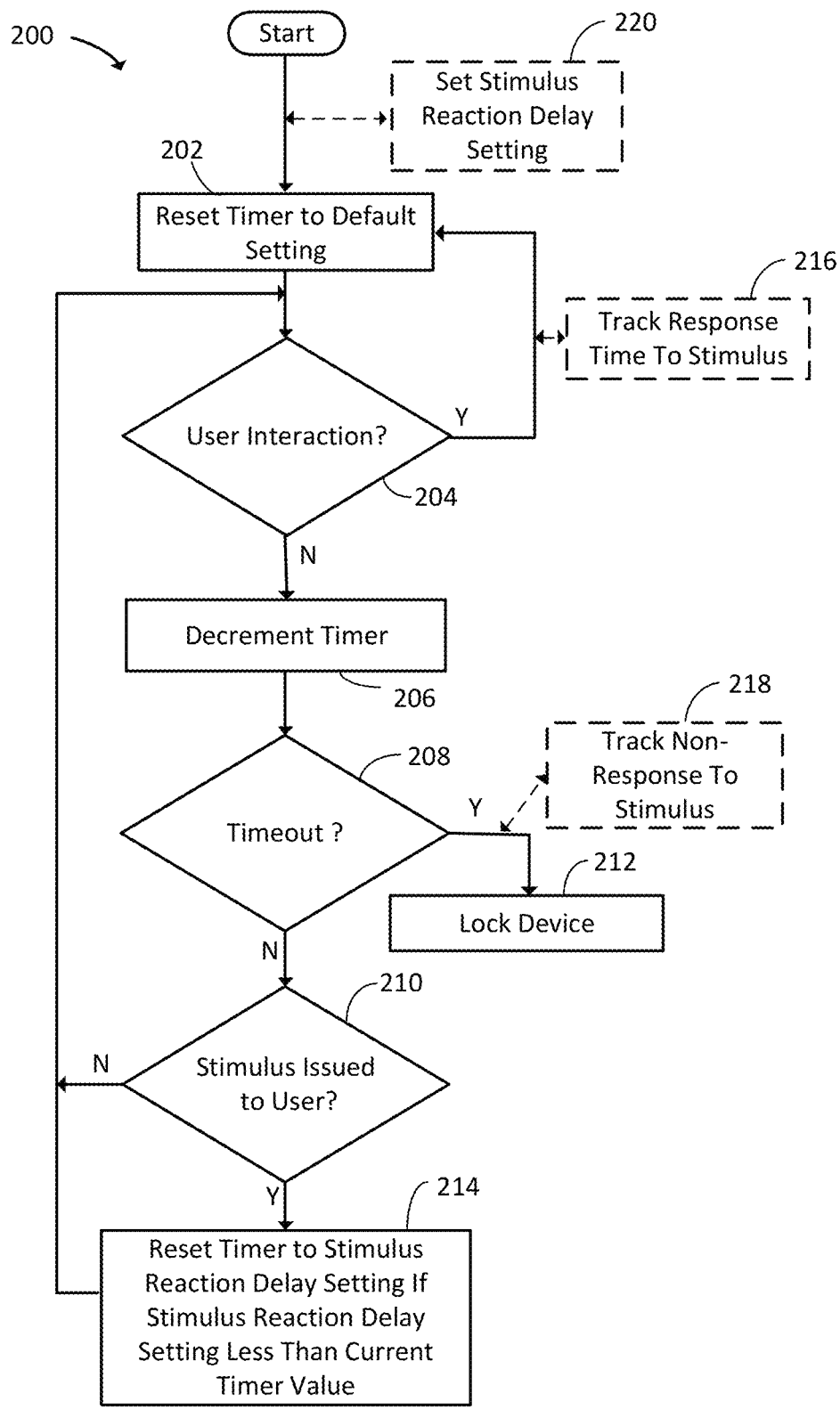
FIG. 2 is a flow diagram of a device lock process taken at the mobile communications device according to embodiments of the present application.

FIG. 2 shows an example device lock process, shown generally by reference 200, and performed by the device 10 when microprocessor 38 executes instructions to implement the device lock module 65. The device lock process 200 is a context aware process in that the timing of the locking action depends on user activity or lack thereof in response to a stimulus. The device lock process 200 attempts to distinguish between two different cases where a mobile communications device has not been subjected to any user actions for a duration of time. In one case, the device is not being used because the user is not close to it—in such a case it is desirable to lock the device as quickly as possible as it may be in an unsecured setting and thus require a high degree of security protection. In the alternative case, the device is in the immediate possession or proximity of the user, however the device is not being used because the user has had no need or desire to use it—for example, the user has not been prompted by any new emails, messages, phone calls or calendar reminders and has not sent any emails or made any phone calls or otherwise interacted with the device 10. In this alternative case, the device 10 is presumably in a safe setting with the user and an immediate device lock is not required.

By distinguishing between the above two cases, a device lock mechanism that balances convenience and security can be provided. For example, in a device lock mechanism that does not distinguish between the two cases, greater security can be provided by always locking a device after a relatively short period of user inactivity; however such locking can be inconvenient and unnecessary when the user of the device is right next to it. In order to distinguish between the two cases, according to embodiments of the present application an assumption is made that a user of a device will generally respond and interact with the device when issued a stimulus. For example, events on the device such as an incoming phone call or a new email or a calendar reminder will typically be accompanied by a stimulus such as an audible sound such as a beep or a physical prompt such as a vibration, and if the user is close to or wearing the device he or she will generally interact with it shortly after receiving the stimulus. Thus, the process 200 assumes that if the user does not react to a stimulus than the device 10 is not near the user. Based on such assumption, the device lock process 200 is configured to use a shorter timeout setting for locking the device after a stimulus is issued than is used if a stimulus is not issued.

As indicated in FIG. 2, the process 200 starts by setting a device lock timeout counter or timer to be equal to a predetermined default timeout value (step 202). The default timeout value is user configurable in an example embodiment—by way of non-limiting example it may be 30 minutes or such other value as the user deems appropriate or as is set automatically when the lock-out module 65 is configured or installed on the device 10. As indicated in step 204, the process 200 checks to see if the user has interacted with the device. The user interaction could for example include, among other things, pressing one or more keys on a keyboard or keypad, pressing or rotating an auxiliary input device 28 such as a thumbwheel, pressing a touch-screen, pressing a touchpad, moving a joystick, or otherwise activating any other form of user input mechanism of the device 10.

If a user input is detected in step 204, the process 200 determines that there is no need to lock the device, and returns to step 202 to reset the device lock timer back to the default timeout value. In the event that no user input is detected in step 204, the device lock timer is decremented (step 206), and then a check is done to determine if time has run out on the device lock timer (step 208). In the event that a timeout has occurred, the device 10 is locked (step 212). Locking of the device 10 will generally prevent anyone from viewing any files, messages or any other information that is stored on the locked device, as well as preventing any email or other messages from being composed or sent, and/or phone calls from being made from the device (except, in some embodiments selected calls such as 911 emergency calls for example may still be permitted from a locked device). Locking of the device 10 effectively prevents the user from entering information into or extracting information out of the device, other than to enter a password or provide some other predetermined user input in order to unlock the device.

Turning again to step 208, in the event that the device lock timer has not run out of time, a check is done to determine if a user stimulus has recently been issued by the mobile device 10. A user stimulus includes attempts by the device 10 to get the attention of a user that may not be currently looking at the device, and in an example embodiment, the user stimulus includes, for example, an audible prompt such as a beep or ring, or a physical prompt such as a vibration. Such prompts may be issued by other applications running on the mobile device 10 for a variety of reasons—for example, stimuli may be issued in response to a new incoming email or other message received over wireless network 50, to announce an incoming phone call or a page, or to issue a reminder of an event scheduled in a calendar-type or to-do-list type of application. If no stimulus has been issued to the user, the process 200 loops back to step 204 and repeats steps 204-210 as set out above. If, however, a stimulus has been issued to the user, the timeout timer is set to a new time out value, namely a "stimulus reaction delay" setting value (step 214) prior to looping back to step 204. In an example embodiment, the timeout timer is only set to the stimulus reaction delay setting in the event that the stimulus reaction delay setting is less than the current amount of time remaining in the countdown to device lock. The reaction delay setting will typically be a much smaller value than the default starting value for the timeout timer—for example it could between a few seconds to 5 minutes, by way of non-limiting example, compared to 30 minutes to an hour for the default value.

Thus, the process 200 effectively provides for at least two time-out settings for the time-out timer, a default setting and a shorter stimulus reaction delay setting. The time-out setting is initially set to the default setting, and starts counting down until either a user interaction with the device 10 occurs, in which case the countdown timer is reset, or until the timer runs out of time, in which case the device locks. In this sense, the device lock process 200 is similar to a traditional lock process. However, unlike in a traditional lock out process, according to embodiments of the present application if during the lock device timer countdown, an audio or physical stimulus is provided to the user, the timer is reset to the shorter reaction delay setting (assuming that the reaction delay setting is less than the current remaining time on the timer). The user must then interact with the device within the time provided by the shorter reaction delay setting, otherwise the device 10 will lock. It will be appreciated that the steps shown in FIG. 2 need not necessarily all be performed in the exact order shown to achieve the desired result.

Such a device lock configuration can provide an improved level of security for data on the device for some users, as the user stimulus that accompanies such events as newly arrived data is effectively used to monitor the proximity of the user to the mobile device such that the device can be quickly locked if a determination is made that the user is not near the device. The presence of such a feature may give the user the comfort level to extend the length of time for the default time-out setting, thereby decreasing the number of unnecessary lockouts and increasing convenience to the user.

In an example embodiment, the stimulus reaction delay setting used in process 200 is installed on the device as a preset value that is user configurable. In some example embodiments, the stimulus reaction delay setting can be automatically and adaptively set by the device 10 based on user response characteristics. For example, some users may take only a few seconds to react to a stimulus, whereas other users may habitually take longer time periods such as a few minutes on average—in example embodiments, the stimulus reaction delay setting on a device 10 is periodically adjusted based on the response time of the use of the device. FIG. 2 includes in phantom blocks 216, 218 and 220 some steps that are added to process 200 in an example embodiment to effect automatic adaptive adjustment of the stimulus reaction delay setting. As indicated in step 216, the response times are stored and tracked whenever a user successfully responds to a stimulus, and as indicated in step 218, a lack of user response to a stimulus that leads to a device lock is also tracked. The process 200 includes a sub-process 220 that uses the values tracked and stored in steps 216 and 218 to adjust the stimulus reaction delay setting based on the tracked response times and non-response times of the user of the device. In various embodiments, the stimulus reaction delay setting may, among other things, be adjusted each time the process 200 is started, may be adjusted at set time intervals, may be adjusted when a threshold amount of response time data has been collected since a previous adjustment, and/or may be adjusted when the tracked values fall outside of predetermined boundaries relative to the current stimulus reaction delay setting. In some embodiments, the user may be prompted to determine if they want to accept an adjusted value as the new stimulus reaction delay setting, or the setting may alternatively be changed without requiring approval from the user.

Although as noted above the stimulus issued to the user in step 210 will generally includes a non-visual component such as an audio sound and/or a physical stimulus, in some embodiments the only stimulus issued may be a visual stimulus on display 22, for example. In some embodiments, different stimulus reaction delay settings could selectively be used based on the event triggering the stimulus and/or the type of stimulus provided to the user. For example, one type of stimulus (for example a certain audio signal or vibration pattern) may be used for an incoming phone call, whereas a different stimulus is used for a new email message, with the stimulus reaction delay setting applied in step 214 being shorter for a phone call than for a new email, given that people are more inclined to react quicker to a phone call than an new email message.

Although the process 200 has been described in the context of a mobile device it could alternatively be applied to a desktop computer system as well.

The lock process 200 is based on certain assumptions about how a user will react to a stimulus when the user is near the device, and the device lock process 200 attempts to adjust the device lock function based on an assumed location or proximity of the device 10 relative to its user. In some example embodiments, the device lock module 65 is configured to adjust the device lock function based on other location relevant information concerning the device 10.

In some embodiments, security settings other than or in addition to the device lock countdown timer could be changed depending on a user's reaction to a stimulus. For example, the lock device module 65 could be configured to require different passwords depending on the user's reaction (or lack thereof)—when locking the device in step 212, a determination could be made if the device is being locked subsequent to a user failure to respond to a stimulus, and if so a more complex password be required to unlock the device than would be required if the device lock was occurring for other reasons.

Figure 3:
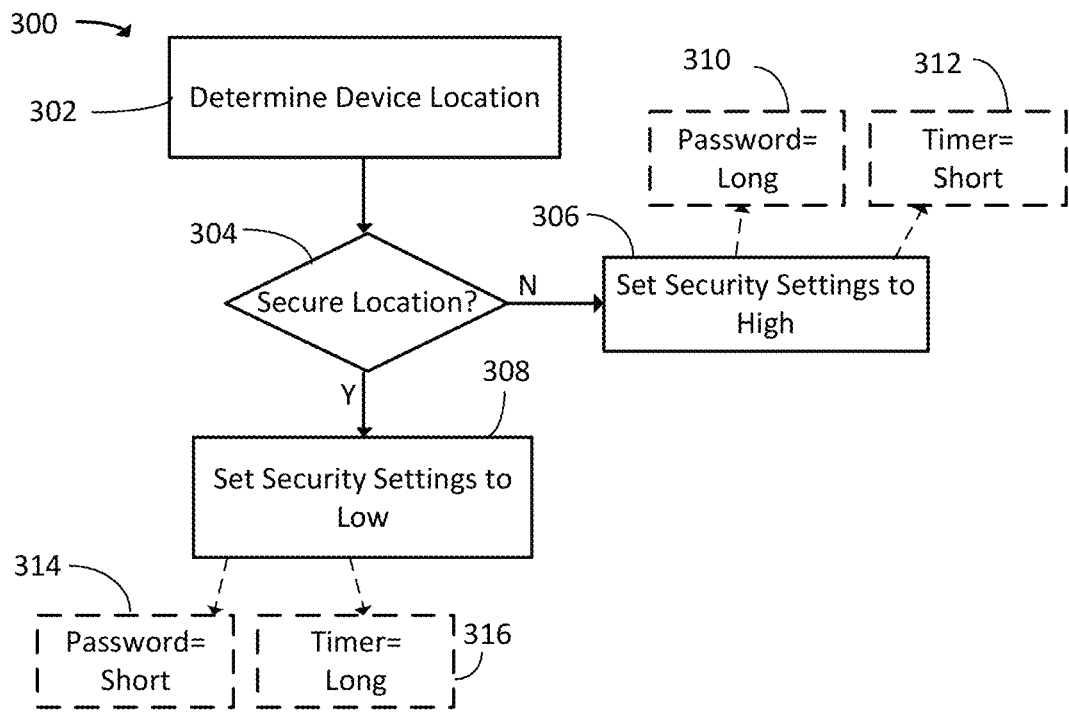
FIG. 3 is a flow diagram of a further device lock process taken at the mobile communications device according to embodiments of the present application.

Reference is now made to device lock process 300 of FIG. 3. The device lock process 300 is configured to provide different security settings for device locking based on a perceived location of the device 10. For example, if the device 10 is perceived to be in a safe setting, security settings that are less stringent but more convenient to the user are applied. If the device 10 is perceived to be in an insecure setting, security settings that are more stringent but less convenient to the user are applied.

As indicated in step 302, a device location is determined. In one example embodiment, among the software applications 58 resident on the device is a locating module 64 for determining a location of the device. The locating module 64 could be part of the device lock module 65, or could be part of another application, or could be a standalone application, among other things. Depending upon the capabilities of the device 10 and the wireless network within which it operates a location for the device 10 could be determined using a variety of methods of varying accuracy. For example, in one embodiment the locating module 64 tracks the current base station 76 within the wireless network 50 that the device 10 is currently communicating with, and in step 304 the device lock module 65 makes a determination as to whether the device is presently in a secure location or not based on the identity of such base station. In such an embodiment, the device 10 maintains a list of one or more identifiers which identify one or more base stations 76 that are considered to be associated with a safe area for the device 10. For example, the base station near a person's home may be identified as one of the safe base stations. In other embodiments, more accurate locating algorithms are applied by the locating module 64. For example, in a device equipped with a GPS receiver 70, a fairly specific location of the device 10 can be calculated based on received GPS signals. In some embodiments, location may be determined based on communications that occur through the short range communications system 40 of the device 10. For example, in a work or home environment having a wireless LAN or other short range communications system, the device 10 location can be narrowed down to a relatively small area. In some embodiments, a location of the device 10 relative to a user may be deduced based on whether the user responds to a stimulus within a predetermined duration (similar to process 200).

If in step 304 a determination is made that the device 10 is not in a secure location, then, as indicated in step 306, one or more security settings used by the device lock module 65 are set to high security values. For example, the device lock module 65 may be configured to accept different predetermined passwords based on the security settings. In step 310, the security settings are set to require a more complex password to unlock the device 10 than would be required in a safe setting. Additionally or alternatively as indicated in step 312, the countdown timer value used to determine the period of user inactivity after which a device lock will occur is set to a shorter duration than would be used in a safe setting.

As indicated in step 308, in the event that a determination is made in step 304 that the device 10 is in a safe location, security settings for the device can be set to a lower value. For example, as indicated in step 314, a shorter or less complex password could be required to unlock the device, and/or as indicated in step 316, a larger time value could be set for the device lock timer.

Although process 300 as shown in FIG. 3 has only two security classification levels branching out from decision block 304, there could actually be three or more classification levels each associated with a different physical location of the device and each having different set of associated security settings—for example, "home" settings for when the device is within a predetermined proximity of the user's home, "work" settings for when the device is within a predetermined proximity of the user's work and "other location" settings for when the device is in other locations.

Figure 4:
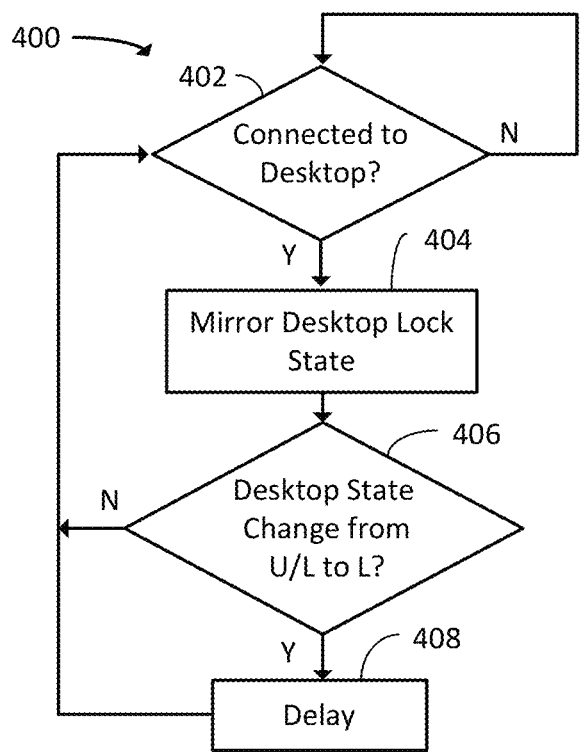
FIG. 4 is a flow diagram of another device lock process taken at the mobile communications device according to embodiments of the present application.

In some embodiments, the settings used by the device lock module 65 could depend on the location of the device 10 relative to a desktop computer 72. For example, as indicated in FIG. 1, in some embodiments the device 10 can communicate through a local interface 74 with a local desktop 72. The interface 74 may for example be a docking station or cradle that physically connects to a serial port 30 or other port of the device 10, or could be a short-range wireless interface for communicating with the short range communications system 40 of the mobile device 10. The device lock module 65 in example embodiments adapts its behaviour depending on whether the device 10 is docked or otherwise in local communication with a desktop computer 72. In this regard, an example process 400 performed by device lock module 65 according to embodiments of the present application is shown in FIG. 4. In the embodiment represented by the process 400, the desktop computer 72 is configured to communicate its current lock state (unlocked or locked) to a locally connected mobile device 10, and the mobile device 10 is configured to mirror the lock state of the desktop computer 72.

Process 400 includes a step 402 of monitoring to determine if the device 10 is locally connected through interface 74 to desktop computer 72. If the device 10 is locally connected to the desktop computer 72, then the lock state of the device 10 is set to be the same as that of the desktop computer (step 404). As indicated in step 406, the device lock module 65 monitors for a change in the lock state of the desktop computer 72 from unlocked (U/L) to locked (L). If the desktop lock state has not changed from unlocked to locked, the device lock module continues to check to see if the device 10 is still locally connected to the desktop computer 72 and if so maintain the device 10 in the same lock state as desktop computer 72. If, however, in step 406 a change in the lock state of the desktop computer 72 from unlocked to locked is detected, then a preset time delay occurs (step 408) after which a determination is made if the mobile device 10 is still locally connected to the desktop computer 72 (step 402), and if so, then the mobile device 10 will also lock up (step 404). The delay in step 408, which may by way of non-limiting example be in the range of a few seconds to a few minutes, is provided to allow a user time to lock their desktop computer and then remove their mobile device 10 from its docking station (thereby severing the local connection with desktop computer 72). If the user does not remove their mobile device 10 from its docking station within the delay provided in step 408, an assumption is made that the user is leaving or has left the device 10 unattended with the desktop computer 72 and so it is then immediately locked. In a further example embodiment, as part of delay step 408, a question to the user is displayed in a user interface window on the mobile device 10 asking if the user wants to lock the device. If the user does not reply within the delay time confirming that the device should not be locked, then the process continues to step 402 and will lock the mobile device if it is still connected to the desktop. If, however, the user confirms within the delay time that they do not want the mobile device locked, then the mobile device will ignore the locked state of the desktop and rely on its own internal device lock timer instead.

It will be appreciated that processes 200, 300 and 400 can in various embodiments be performed independently of each other, or in some embodiments can be combined and either performed in parallel with each other or sequentially with each other. For example, in process 300 the security settings set based on device location could include the timer default value used in step 202 of process 200 and/or the stimulus reaction delay value used in step 214.

Although the above description has focussed on adoption of settings for a device lock process, settings for other applications on the device 10 could also be adaptively configured based on perceived or actual changes in the real or relative position of the mobile device 10. For example, in various example embodiments, the mobile device 10 includes among software applications 58 an instant messaging module 67 and/or an email filtering module 66. In an example embodiment, the general status setting used by the instant messaging module 67 is set automatically based on a determined location of the device 10—for example status settings of "user is home"; "user is at work"; or "user is away", etc. could be automatically selected based on device location. Similarly, email filter settings associated with filtering module 66 are automatically adapted to apply different filtering criteria based on device location—for example, the filter settings in a user home location may be designed to filter out notifications for work-related emails. In the case of adaptive instant messaging and email filtering, the changes in settings or user location need not be communicated to an external server, thus ensuring the user privacy is not a concern.

According to one example embodiment, an electronic device is provided that includes a processor, an output device connected to the processor for issuing a stimulus to a user of the device, at least one input device connected to the processor and responsive to user input activity, and a device lock module associated with the processor for (i) implementing restrictions on user access to the device if user input activity falls below a threshold; and (ii) redetermining the threshold if a stimulus is issued by the output device.

According to another example embodiment, a method is provided for providing security for a mobile communications device, including steps of: monitoring for predetermined user interaction with the mobile communications device; locking the mobile communications device if the predetermined user interaction is not detected within a predetermined lockout time interval; and resetting the lockout time interval to a shorter value if a user stimulus is issued by the mobile communications device.

According to a further example embodiment, a mobile device is provided that includes a processor, at least a first input device connected to the processor for providing input signals thereto, an output device connected to the processor for providing output to a user of the mobile device, the processor being configured for determining location information for the mobile device based on input signals received from the first input device and adjusting an operating characteristic of the electronic device based on the determined location information.

According to a further example embodiment, a method is provided for providing security to a mobile electronic device including steps of: receiving input signals from an input device of the mobile electronic device; determining if the mobile electronic device is in a secure location based on the input signals; and applying a first security setting to the mobile electronic device if it is in the secure location and applying a second security setting to the mobile electronic device if it is not in the secure location.

According to a further example embodiment, there is provided an electronic device that includes a processor; an output device connected to the processor for issuing a stimulus to a user of the electronic device; at least one input device connected to the processor and responsive to user interaction; and a device lock module associated with the processor for implementing restrictions on user access to the electronic device if user interaction is not detected within a predetermined lockout-time interval, the device lock module being configured for resetting the lockout-time interval into a shorter value if a user stimulus is issued by the output device.

According to a further example embodiment, there is provided a method for providing security for a mobile communications device, comprising steps of: monitoring for predetermined user interaction with the mobile communications device; locking the mobile communications device if the predetermined user interaction is not detected within a predetermined lockout time interval; and resetting the lockout time interval to a shorter value if a user stimulus is issued by the mobile communications device.

The embodiments of the present application described above are intended to be examples only. Those of skill in the art may effect alterations, modifications and variations to the particular embodiments without departing from the scope of the present application. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

What is claimed is:

1. An electronic device comprising:
   a processor configured to:
   determine location information concerning the electronic device, wherein the location information comprises a location of the electronic device;
   determine whether the location of the electronic device is in a secure location;
   select an initial countdown timer value, the initial countdown timer value having a high value when the device is in the secure location, and a low value when the device is not in the secure location;
   initialize a timer with the initial countdown timer value;
   start the timer;
   reset the timer to the initial countdown timer value in response to detecting any user input at the electronic device before the timer expires; and
   locking the electronic device upon the timer expiring.

2. The electronic device of claim 1, wherein the location information is determined based on GPS.

3. The electronic device of claim 1, wherein the location information is determined based on communication using a short-range communications system.

4. The electronic device of claim 1, wherein the location information is determined based on communication with a wireless LAN.

5. The electronic device of claim 1, wherein the location information is determined based on communication with a base station.

6. The electronic device of claim 1, wherein the location information is determined based on communication with another device.

7. The electronic device of claim 1, wherein the location information is determined based on location of the electronic device relative to another device.

8. The electronic device of claim 1, wherein the location information is determined based on proximity of the electronic device relative to its user.

9. A method performed by an electronic device, the method comprising:
   determining location information concerning the electronic device, wherein the location information comprises a location of the electronic device;
   determining whether the location of the electronic device is in a secure location;
   selecting an initial countdown timer value, the initial countdown timer value having a high value upon determining the device is in the secure location, and a low value when the device is not in the secure location;
   initializing a timer with the initial countdown timer value;
   starting the timer;
   resetting the timer to the initial countdown timer value in response to detecting any user input at the electronic device before the timer expires; and
   locking the electronic device upon the timer expiring.

10. The method of claim 9, wherein the location information is determined based on GPS.

11. The method of claim 9, wherein the location information is determined based on communication using a short-range communications system.

12. The method of claim 9, wherein the location information is determined based on communication with a wireless LAN.

13. The method of claim 9, wherein the location information is determined based on communication with a base station.

14. The method of claim 9, wherein the location information is determined based on communication with another device.

15. The method of claim 9, wherein the location information is determined based on location of the electronic device relative to another device.

16. The method of claim 9, wherein the location information is determined based on proximity of the electronic device relative to its user.

17. A non-transitory computer-readable medium storing computer-executable instructions which, when executed by a processor of an electronic device, cause the electronic device to:
   determine location information concerning the electronic device, wherein the location information comprises a location of the electronic device;
   determine whether the location of the electronic device is in a secure location;
   select an initial countdown timer value, the initial countdown timer value having a high value when the device is in the secure location, and a low value when the device is not in the secure location;
   initialize a timer with the initial countdown timer value;
   start the timer;
   reset the timeout setting in response to detecting any user input at the electronic device before the timer expires; and
   lock the electronic device upon the timer expiring.

18. The non-transitory computer-readable medium of claim 17, wherein the location information is determined based on GPS.

19. The non-transitory computer-readable medium of claim 17, wherein the location information is determined based on communication using a short-range communications system.

20. The non-transitory computer-readable medium of claim 17, wherein the location information is determined based on communication with a wireless LAN.

21. The non-transitory computer-readable medium of claim 17, wherein the location information is determined based on communication with a base station.

22. The non-transitory computer-readable medium of claim 17, wherein the location information is determined based on communication with another device.

23. The non-transitory computer-readable medium of claim 17, wherein the location information is determined based on location of the electronic device relative to another device.

24. The non-transitory computer-readable medium of claim 17, wherein the location information is determined based on proximity of the electronic device relative to its user.

* * * * *